United States Patent Office 2,911,886
Patented Nov. 10, 1959

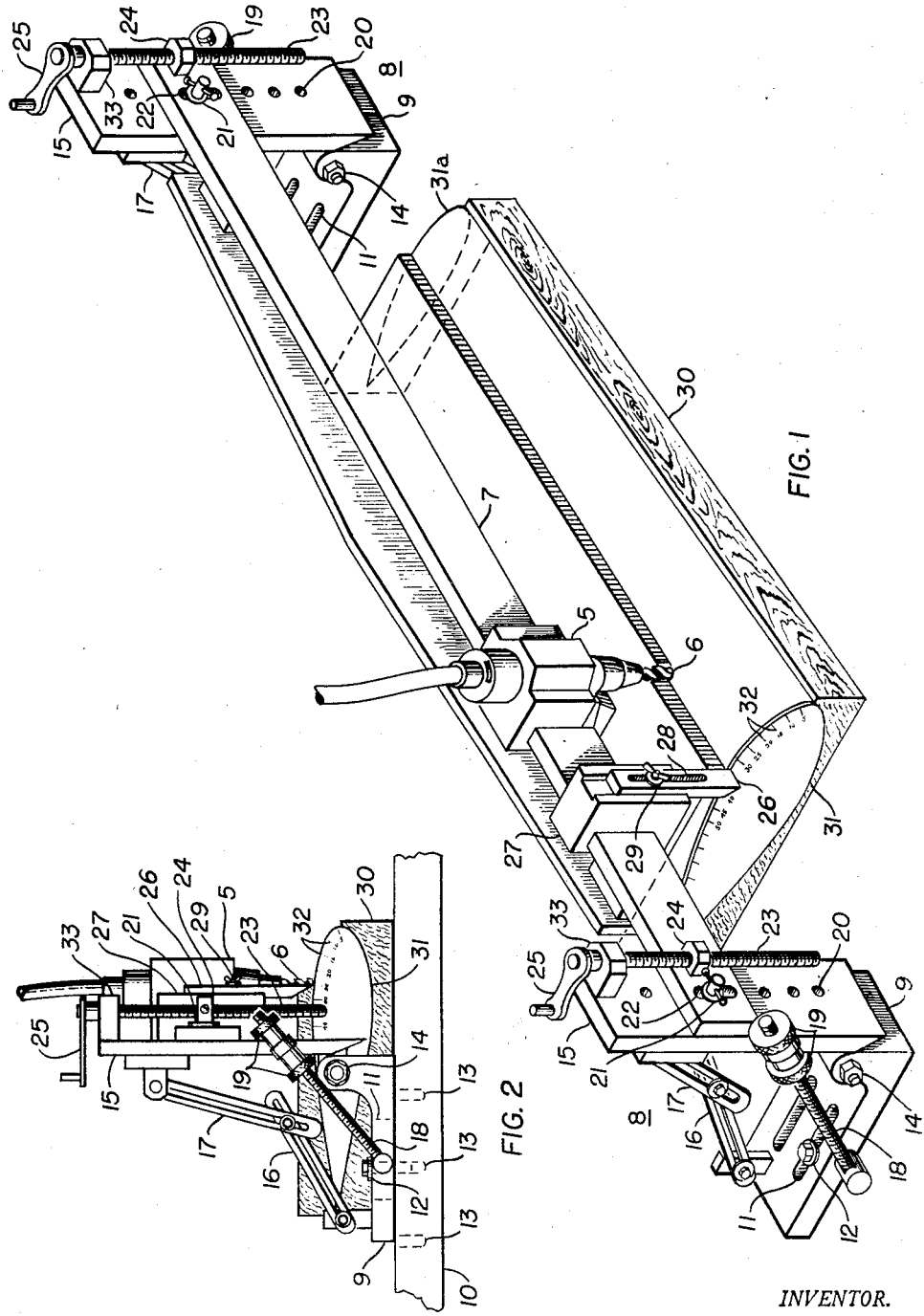

2,911,886

MACHINE FOR MACHINING AIRFOIL OR SIMILAR SHAPES

Robert Young, Baltimore, Md., assignor to The Martin Company, Middle River, Md., a corporation of Maryland Application March 24, 1955, Serial No. 496,492

2 Claims. (Cl. 90—15)

This invention relates to contouring a workpiece by successive movements of a power driven cutter adjustably set in selected cutting positions about the workpiece.

Production of certain aircraft structural elements such as aircraft wings and tapered skins requires production of conic surfaces on relatively large surfaces. The use of conventional milling machines to ensure the accuracy required results in an undesirably slow rate of production reflected in high cost of the members produced. Special purpose tools specifically designed for contour milling of large surfaces are extremely expensive and not generally available. The machine contemplated by the present invention provides a cheap, fast, accurate device for and method of contour cutting obviating the requirement for expensive contemplated special purpose machines or wasteful use of conventional machine tools.

In addition the machine contemplated herein is well adapted to quickly, accurately and cheaply contour wing core material, such as thin wall honeycomb structural material. Present machinery used for this purpose is large and complicated, and beyond the financial resources of the small manufacturer. The device and method contemplated are cheap, simple and accurate and fill the need for such a device.

Likewise, construction of models of contoured surfaces and especially such complex surfaces as aircraft wings, ailerons, flaps, rudders, fins, stabilizers and elevators is at present an unsystematic and time-consuming procedure. Present methods which do not necessarily produce uniform results consist essentially of the use of hand tools to form a contour, the outline of which is determined by templates placed at the ends of the workpiece. This operation is not only laborious but requires the skill of an experienced artisan. With the constant changes made in present aircraft designs, a need for rapid and uniform construction of such models is apparent.

It is an object of my invention to provide a device having an automatic cutting action to form a uniform contoured surface on a workpiece which surface conforms acceptably to the desired ideal surface but without requiring the degree of mechanical skill heretofore thought necessary.

Another object of my invention is to provide easily operative adjustments in horizontal, vertical and angular positions for setting the cutter to operate in substantially any desired plane.

Still another object of my invention is the provision of a new method for contouring workpieces in which a cutter slidable along a guide track has its cutting paths determined by independent adjusting movements of the ends of the track.

Another object of my invention is to provide a machine type of action by the automatic cutter in forming the desired contour of the workpiece thus enabling the production of several identical articles.

With the above and other objects in view, which will appear as the description proceeds, the invention resides in the combination and arrangement of parts and in the details of construction hereinafter described and claimed, it being understood that various changes in the precise embodiment of the invention herein disclosed may be made within the scope of what is claimed without departing from the spirit of the invention.

In the accompanying drawings which are made part of this specification:

Figure 1 is an isometric view of the machine.

Figure 2 is an end elevation looking from the left in Figure 1.

In reference to the drawings in which similar reference numbers designate corresponding parts throughout the several views, numeral 5 represents any high-speed power-driven device for locally cutting off and removing material in a rapid fashion and called for convenience a router. The router includes a suitable cutting tool 6 designed to machine a workpiece 30 to a desired contour, the said router 5 being mounted on a bar or elongated guide track 7 for sliding movement in either direction therealong. The router 5 has a noncircular sliding engagement with the said guide track 7 to prevent its turning about the lengthwise axis of the track 7.

Each end of the said track 7 is supported by an adjustable mounting assembly 8 which includes a base member 9 resting on a supporting member 10, and slidable thereon in a direction substantially normal to the direction of track extension. This slidable connection may consist of a slot 11 loosely receiving a clamping screw 12 threaded into a suitable opening 13 in the supporting member 10. Some lateral freedom of movement of the screw 12 in the slot 11 is also permitted as will hereinafter appear.

Each base member 9 has pivotally mounted thereon by means of a pivot pin 14, a swinging arm hereinafter referred to as a pivoted member 15 carrying one end of the track 7, by means of which the track can be swung to various angular positions about the pivotal axis. The axis of pivot pins 14 are arranged parallel to the direction in which the track 7 extends. Suitable adjustable brace means such as slotted links 16 and 17, or threaded shaft 18 with hand nuts 19 are provided for firmly securing pivoted member 15 in desired adjusted position.

In order that the track ends may be moved towards and away from the pivots 14 along the pivoted members 15, adjustable connecting means are provided, for example, a series of threaded openings 20 in the members 15 for alternatively receiving clamp screws 21. An elongated opening 22 in each end of the track 7 surrounds the shank of the corresponding screw 21 and permits refined adjustment of the track position.

In the preferred form of the invention shown in the drawing the movement for this refined adjustment is made by the turning action of a threaded shaft 23 acting on a receiving nut 24 which is attached to the end of the track 7. An unthreaded end of the shaft 23 is mounted by a shaft support 33 to the pivoted member 15 to support the threaded shaft 23 and allow it to turn freely in place. A suitable handle 25 extended from the shaft 23 is provided to turn the shaft in either clockwise or counterclockwise direction.

The setting of the track guide 7 is facilitated by a pointer 26 carried by a pointer support 27 which is engaged with the track for nonrotary sliding movement in either direction therealong. The pointer 26 is also slideable on support 27 in a direction transverse to the lengthwise axis of the track and is slotted at 28 to receive a clamp screw 29 which serves to secure the pointer in adjusted position on support 27.

Suitable reference guides or templates will normally be arranged for cooperation with the pointer 26 to assist the operator in determining the proper adjustments of the mounting assemblies 8, and in the embodiment shown, these guides consist of templates 31, 31a attached to those opposite ends of workpiece 30 which face the base members 9 to establish the desired contour. The templates 31, 31a are marked with an equal number of divisions 32 along their peripheries although the templates may be of different size and shape and serve between them to establish the desired contour.

The operation of this machine is as follows. The router 5 and pointer support 27 are brought together and pointer 26 adjusted to the exact level of the lower cutter face where it is clamped by screw 29. The router and pointer support are then separated and the workpiece 30, with the templates 31 and 31a mounted on its end surfaces, is placed between them and securely fastened to the supporting member 10 in the general area beneath the guide track 7. Using the pointer 26, the operator then positions the guide track 7 parallel to an imaginary line connecting those division marks 32 having the same indicia on the periphery of the templates. The clamping screws 12 are then loosened to permit free movement of the base members 9, and the angle settings of the arms 15 about pivots 14 are approximately set using the slotted links 16 and 17, the threaded shaft 18, and the hand nuts 19. To this end it is usually convenient to have the stations indicia 32 on the templates 31, 31a include a line segment of sufficient length normal to adjacent periphery to permit lining up of pointer 26 or cutter 6 therewith to give an angular setting by eye which is fairly accurate. By sliding the pointer 26 along track 7 it can be compared with the appropriate indicia on template 31 and cutter 6 can be compared with appropriate indicia on template 31a; for example, the marks identifying the first station on the templates.

It may and probably will be necessary to adjust somewhat the positions of base members 9 during the angle setting, in order to bring the pointer 26 into proper relation to the indicia 32, and the base members may then be fixed in an appropriate position by means of clamp screws 12. At this point it will be noted that the play permitted screws 12 in slots 11 provides for slight cocking movements of the whole organization so that the organization need not move exactly parallel to the slots 11, thus accommodating the varieties of movements necessary when the templates 31, 31a differ in size.

A final adjustment can then be made to fix the radial position of the ends of track 7 along members 15 to control the depth of cut. This can be accomplished by rotating the handle 25 for the end requiring adjustment until the pointer 26 or tool 6 just touches its template periphery. These positions can be firmly held by tightening clamp screws 21. The end face of tool 6 is normally designed to cut a flat surface and the foregoing adjustments will bring the surface defined by the cutter end into the tangential relationship with the ideal completed surface as defined by the templates.

The power is then turned on and router 5 is slid back and forth on the track 7 to make the initial cut. Thereafter a setting is made according to the steps previously outlined for each set of stations on the templates 31, 31a, and a similar cut taken until the desired shape as defined by the templates is complete.

It will be observed that the adjustments described provide in effect for independent positioning of the ends of the track 7 substantially at any desired location in planes extending through said ends transversely thereof, in combination with a rotation of the track about its longitudinal axis, which type of adjustment motion is considered an important feature of the invention.

Although the invention has been described for use in producing contoured surfaces in models, its use for producing such surfaces in other pieces of work are obvious to those skilled in the art. Therefore, the application of the invention to produce contoured surfaces in models is not meant to place any limitation on the invention.

Having thus described my invention I claim:

1. A routing machine adapted to perform successive cutting operations on a workpiece, comprising a guide track adapted to be disposed adjacent substantially the length of the workpiece, and having mounted at each end an adjustable mounting means, routing means mounted upon said guide track for slidable movements therealong, and alignment means operative in conjunction with said adjustable mounting means for precisely locating said routing means with respect to said workpiece so that successive cuts with said routing means may be taken to create a desired contour on said workpiece, said alignment means including indicia-bearing template means adjacent said workpiece, and stylus means on said guide track arranged to be correlated with said template means to establish a correct cutting path across said workpiece, said adjustable mounting means including means for independent height adjustments of the ends of said guide track, means for adjusting said mounting means in a plane substantially perpendicular to the height adjustment direction so that one end of said guide track can be moved a greater distance between cutting operations than the other end, and finally means for tilting said guide track so that the rotational axis of said routing means can be maintained substantially perpendicular to the tangent of each successive surface to be created on said workpiece as established by said alignment means and said adjustable mounting means, whereby a workpiece of desired contour can be established.

2. A machine adapted to perform cutting operations on a workpiece, comprising a guide track adapted to be disposed adjacent substantially the length of the workpiece, and having adjustable mounting means for facilitating the positioning of said guide track with respect to said workpiece, cutter means mounted upon said guide track for slidable movements therealong, and alignment means operative in conjunction with said adjustable mounting means for precisely locating said cutter means with respect to said workpiece, said alignment means including template means adjacent said workpiece, and means cooperative with said template means for establishing the positioning of said guide track so that desired cutting paths across said workpiece can be brought about, said adjustable mounting means including means permitting unequal height adjustments of the ends of said guide track so that said cutter means can make sloping transverse cuts across said workpiece, means for adjusting said mounting means in a plane substantially perpendicular to the height adjustment direction so that one end of said guide track can be moved a greater distance between cutting operations than the other end, and finally means for tilting said guide track so that the rotational axis of said cutting means can be maintained substantially perpendicular to the tangent of each successive surface to be created on said workpiece as established by said alignment means and said adjustable mounting means, whereby a workpiece of desired contour can be established.

References Cited in the file of this patent

UNITED STATES PATENTS

| 1,895,054 | Steinmeyer | Jan. 24, 1933 |
| 2,202,767 | Trosch | May 28, 1940 |
| 2,366,200 | Langhorst | Jan. 2, 1945 |
| 2,415,269 | Yeomans et al. | Feb. 4, 1947 |
| 2,660,096 | Morton | Nov. 24, 1953 |
| 2,691,206 | Kautz | Oct. 12, 1954 |
| 2,730,020 | Pollock et al. | Jan. 10, 1956 |
| 2,787,197 | Gordon | Apr. 2, 1957 |

FOREIGN PATENTS

| 478,148 | Germany | June 18, 1929 |
| 1,052,691 | France | Sept. 23, 1953 |
| 711,830 | Great Britain | July 14, 1954 |